(12) United States Patent
Sato et al.

(10) Patent No.: US 6,544,570 B1
(45) Date of Patent: Apr. 8, 2003

(54) METHOD FOR TREATING BRASSICACEOUS VEGETABLES AND PRODUCING BRASSICACEOUS VEGETABLE BEVERAGES

(75) Inventors: Takashi Sato, Shizuoka (JP); Takanobu Takihara, Shizuoka (JP); Hikari Kato, Shizuoka (JP); Hirokazu Hosoyama, Shizuoka (JP)

(73) Assignee: ITO EN, Ltd., Tokyo (JP)

( * ) Notice: Subject to any disclaimer, the term of this patent is extended or adjusted under 35 U.S.C. 154(b) by 32 days.

(21) Appl. No.: 09/669,566

(22) Filed: Sep. 26, 2000

(30) Foreign Application Priority Data

Mar. 29, 2000 (JP) ........................................ 2000-091285

(51) Int. Cl.[7] .............................. A23L 2/00; A23L 2/02; A23L 2/78
(52) U.S. Cl. ..................... 426/271; 426/486; 426/487; 426/488; 426/489; 426/492; 426/518; 426/520; 426/620
(58) Field of Search ................................ 426/271, 486, 426/487, 488, 489, 492, 518, 520, 615

(56) References Cited

U.S. PATENT DOCUMENTS

| | | | | |
|---|---|---|---|---|
| 3,293,046 A | * | 12/1966 | Werther | ...................... 426/487 |
| 5,407,696 A | * | 4/1995 | Hagiwara et al. | ........... 426/271 |
| 5,686,108 A | * | 11/1997 | Pusateri et al. | |
| 5,858,433 A | * | 1/1999 | Deguchi et al. | ............ 426/271 |

FOREIGN PATENT DOCUMENTS

| | | |
|---|---|---|
| JP | 10-76 | 1/1998 |
| JP | 10-42841 | 2/1998 |
| JP | 11-155513 | 6/1999 |

* cited by examiner

*Primary Examiner*—Helen Pratt
(74) *Attorney, Agent, or Firm*—Sughrue Mion, PLLC

(57) ABSTRACT

The present invention has an object which is not to allow a characteristic discomfort smell to generate in processing brassicaceous vegetables typical of cabbages. According to the present invention are provided processes in which after pretreatment of loosening whole vegetables, heat treatment is carried out by directly applying steam to them in such a manner that the temperature of the vegetables is allowed to maintain in the range of about 80 to 95° C., followed by subsequent chopping and squeezing steps. The heat treatment can result in deactivating enzymes causing a discomfort smell, and the activation of enzymes can be suppressed also during the chopping and squeezing steps, and consequently no formation of a nasty smell characteristic of brassicaceous vegetables can be achieved.

12 Claims, No Drawings

METHOD FOR TREATING BRASSICACEOUS VEGETABLES AND PRODUCING BRASSICACEOUS VEGETABLE BEVERAGES

BACKGROUND OF THE INVENTION

1. Field of the Invention

The present invention relates to methods for treating brassicaceous vegetables capable of reducing the formation of a nasty smell characteristic of vegetables belonging to Brassicaceae and methods for producing brassicaceous vegetable beverages.

2. Related Art Statement

These kinds of vegetables, that is, brassicaceous vegetables typical of cabbages, are rich not only in vitamin U having a nutritional value, but also in vitamin C and dietary fiber. In addition, they have been recently notable, in particular, as material for producing vegetable juices and the like, since it has been found that they have an effect on inhibiting cancer cells and preventing gastric ulcer.

When vegetable beverages are produced by squeezing vegetables, processes of a chopping step followed by a squeezing step are in general carried out. In particular, in the case of brassicaceous vegetables, since allyl isothiocyanate (AITC) contributing to discomfort odor is generated by activating enzymes upon chopping them, the chopping step is a problematic step in producing vegetable juices to be readily drunk.

For example, Japanese Patent Laid-open Publication Hei 10-42841 notices that a chopping treatment, such as shredding, results in activation of enzymes responsible for the formation of a nasty smell, and discloses a treating method for reducing the formation of a nasty smell by the addition of vitamin C at the step of chopping vegetables, and furthermore squeezing the chopped vegetables before concentration.

As described above, however, when vitamin C is added at the chopping step, and subsequent steps of heating and squeezing are carried out, vitamin C is necessary to add again in order to adjust the acidity after squeezing, since heating will cause the decomposition of vitamin C. This means that expensive vitamin C must be used in a large amount.

OBJECT AND SUMMARY OF THE INVENTION

In consideration of such problems, the present invention is intended to provide a new method for treating brassicaceous vegetables and a method for producing brassicaceous vegetable beverages which do not allow a characteristic discomfort odor to generate upon treating brassicaceous vegetables typical of cabbages, and in addition, enables to reduce the amount of expensive vitamin C to be used.

In order to solve such problems, the present invention provides a treatment of heating brassicaceous vegetables before chopping them. Since the heat treatment before chopping can result in deactivating enzymes, enzymes causing the formation of components of a discomfort smell during the chopping step can not be activated, and thereby the generation of a nasty smell characteristic of brassicaceous vegetables can be eliminated.

For heating at this step, it is preferable that heating is carried out such that the temperature of the vegetables is allowed to maintain in the range of about 80 to 95° C. Means for heat treatment preferably take means of increasing the temperature of the vegetables by "steaming," that is, by steam.

If the temperature of the vegetables is below 80° C., it may be likely that enzymes are not fully deactivated, whereas if the temperature rises over 95° C., it may be likely that the thermal decomposition of a useful component, vitamin U, is increased. However, the requirement for the treating temperature is influenced by the pressure, atmosphere, and the like, and therefore similar effects can be expected, even if the temperature changes by about 5° C. below or above the temperature described above. In addition, heating by "steaming" allows heat treatment with retaining the freshness of the vegetables, and furthermore, does not cause smell resulting from heating, such as a burnt smell, even if the temperature of the vegetables is increased to 95° C. Heat treatments, in general, involve blanching (boiling). Blanching causes the contents of the vegetables to leach out into the boiling water, resulting in reduced Brix (soluble solid components), whereas steaming is better in that enzymes can be deactivated without reducing Brix (soluble solid components).

In the case of heat treating whole cabbages, for example, it may be likely that the deactivation of enzymes becomes insufficient in places due to difficulties in heating them uniformly. Increasing the heating temperature in order to avoid such partial deactivation will lead to the thermal decomposition of the contained vitamin U. Now, the present invention provides optional pretreatments, such as removing core portions containing particularly a large amount of isothiocyanates such as AITC, making cuts into vegetables, making leaves apart, or the like. Pretreatments like these can suppress the activation of enzymes to a minimum, and apply uniformly and efficiently heat to vegetables such as cabbages and the like, even if they do not readily transfer heat to their core portions.

Furthermore, it is preferable that vegetables which has been heat treated as described above are subjected to a treatment by contacting, after chopping (including shredding, grinding and the like) and squeezing, the squeezed fluid with an anion exchanger provided with the structure comprising mixing at least one or more inorganic anions and at least one or more organic acids to form ionic bonding, that is, an ion exchanger in which inorganic anions and organic acid(s) are forced to form ionic bonding to the ion-exchanging groups. Even if any component causing a nasty smell still remains in the squeezed fluid, such a component can be removed by this ion-exchange treatment. Although brassicaceous vegetables are known to contain a high level of nitrate, this treatment can be intended to reduce nitrate ion. Furthermore, it is possible that by the treatment with such an anion exchanger, components beneficial to the taste and health, such as minerals and the like, are maintained at the same time.

Treated fluid obtained by the treatments according to the present invention may be optionally subjected to treatments such as filtration, adjustment of the concentration, sugar content, and pH, sterilization, and the like, and have various applications such as beverages and other drinking, cooked food, seasonings, and the like.

DESCRIPTION OF THE PREFERRED EMBODIMENT

Now, preferred embodiments will be described as follows.

An optimal embodiment of methods for treating brassicaceous vegetables and producing brassicaceous vegetable beverages according to the present invention is carried out via the steps of pretreating raw materials, heat treating, chopping, squeezing, ion-exchange treating, and post-treating. Note that this exemplifies an optimal embodiment, and that not all of these steps are the indispensable step of the present invention.

Hereinafter, each step will be described.

(Raw Materials)

Brassicaceous vegetables which can be employed as raw materials in the present invention are cabbage, Chinese cabbage, Chinese radish, broccoli, cauliflower, kale, turnip, and other brassicaceous vegetables which have been eaten, including their leaves, petioles, stems, roots, flowers, fruits including fruit vegetables, kernels, seeds, and other tissues or parts of the vegetables.

(Pretreatment Step)

These vegetables as raw materials are preferably subjected to pretreatments such as optional washing and peeling, optional removal of core portions, making cuts into the vegetables or making leaves apart so as to allow heat to-transfer readily, or the like. However, depending on the kind or size of the vegetables, some pretreaments may be not required.

In the case of vegetables such as cabbage, Chinese cabbage, broccoli, cauliflower, and kale, it is preferable to remove, in particular, their core portions in advance, since the core portions of these vegetables contain, in particular, large amounts of isothiacyanates such as AITC and the like, and in addition, are difficult in the rise of the temperature.

(Heat Treatment Step)

The vegetables thus pretreated are subjected to heat treatment under a predetermined condition.

Any means for heating can be employed, including blanching (boiling) treatment, heating means by a tubular or kneader, or by steam injection or the like, or heating means which are currently applied to vegetables, under the atmosphere of air, an inert gas, steam, or the like. Among them, for reasons as described above, it is preferable to employ "steaming," that is, means for raising the temperature of the vegetables by steam.

For particular means of "steaming," steam at 90 to 100° C., for example, can be directly applied to the vegetables in a batch or continues apparatus.

Heating at this step is preferably carried out such that the temperature of the vegetables is maintained in the range of temperatures of about 80 to 95° C. In particular, by steaming for about 5 to 20 minutes after reaching a temperature in the range of 90 to 95° C., the formation of a nasty smell can be suppressed to a substantial extent.

(Chopping Step)

It is preferable to start a chopping step in as a short time after heat treatment as possible. In this case, the chopping treatment means to include breaking into pieces such as shredding, grinding, and the like.

Chopping can be carried out according to usual procedures with presently known chopping machines such as grinders, dicers, slicers, cutters or the like as chopping means. The degree of chopping can be set as desired, for example, at an average diameter of about 1 to 100 mm or the like. One feature of the present invention is that breaking vegetables into any small pieces does not cause activation of enzymes to form a discomfort smell, because enzymes have been deactivated by heating in advance.

The size, shape, and the like of chopped vegetables are preferably determined as appropriate, depending on the subsequent squeezing method.

(Squeezing Step)

Vegetables thus chopped are squeezed according to usual procedures with currently known squeezing machines such as decanters, screw presses, or the like. Squeezed fluid is optionally concentrated according to usual procedures with known concentrators such as concentrators under reduced pressure, stirred thin-film concentrators, or plate-type concentrators. Of course, the concentrating step may be carried out after the ion-exchanging treatment as described below, or concentration may not be performed, depending on the type of final products.

(Ion-Exchanging Treatment Step)

The squeezed fluid obtained by the previous treatment is preferably treated in contact with an anionic exchanger provided with the structure comprising mixing at least one or more inorganic anions and at least one or more organic acids to form ionic bonding, that is, an ion-exchanger in which inorganic anions and organic acid(s) are forced to bind to the ion-exchanging groups.

"An anionic exchanger provided with the structure comprising mixing at least one or more inorganic anions and at least one or more organic acids to form ionic bonding" is intended to mean an anionic exchanger provided with the structure having ionic bonding of both at least one or more inorganic anions and at least one or more organic acids to the ion-exchanging groups respectively, rather than an anionic exchanger comprising forming ionic bonding of only hydroxide ion, only inorganic anions, or only organic acid(s) to the ion-exchanging groups. Such an ion-exchanger preferably comprises forming ionic bonding of inorganic anions to 5 to 95% of the whole ion-exchanging groups, with respect to the ratio of the ionic bonding of inorganic anions and organic acid(s) in the area contacting with the squeezed vegetable fluid and the anionic exchanger.

"An anionic exchanger" for use in the present invention can employ that pretreated to make inorganic anions and organic acid(s) form ionic binding to "an anion-exchanging resin" commonly used. "An anion-exchanging resin" containing the basic structure of "an anionic exchanger" prior to pretreatment described above, that is, "an anionic exchanger employed for contact treatment," can be particularly exemplified by Diaion SA series (SA 10A, 11A, 12A, 20A, 21A, and the like), PA series (PA 306, 308, 312, 316, 318, 406, 408, 412, 416, 418, and the like), and WA series (WA 10, 11, 20, 21, 30, and the like), Amberlite IRA series (IRA-400, 410, 900, 9 3ZU, and the like).

The "pretreatment of an anionic exchanger" described above is preferably carried out by methods of binding inorganic anions and organic acid(s) to an anion-exchanging resin simultaneously, that is, methods in which an anionic exchanger is contacted with an aqueous solution dissolving both inorganic anions and organic acid(s) (referred to as an "acid contacting step"). The acid contacting step can be carried out by, for example, packing an anion-exchanging resin into a column, pouring an aqueous solution dissolving both inorganic anions and organic acid(s) to the column inlet, and continuing passing the aqueous solution through the column until the composition of the component of the solution discharged from the column outlet is almost the same as that of the aqueous solution before passing. "Inorganic anions" to be bound to an anion-exchanging resin can include chloride, sulfate, nitrate, nitrite, phosphate ions, and the like. However, in view of the purpose of the present invention, nitrate and nitrite ions should be ruled out from the selection of inorganic anions. In addition, taking influence on taste into consideration, it is preferable that it is necessary to include at least one or more ions selected from chloride and sulfate ions. Other inorganic anions may be bound, provided that these requirements are satisfied.

"Organic acid(s)" to be bound to an anion-exchanging resin can include citric, malic, tartaric, lactic, L-ascorbic, fumaric, gluconic, acetic, adipic acids, and the like, and is/are not limited to specific acids, if the addition to foods does not cause any undesirable effect. However, it is preferable to preclude oxalic acid, because oxalic acid is known to be harshness of foods, and also a substance responsible for reducing stability of properties and taste.

For contact treatment of squeezed vegetable fluid with an anionic exchanger, either batch or continuous ways can be selected. In view of productivity, it is preferable to select such a continuous contact treatment that samples can be fed and removed continuously in an ion-exchanging reactor such as a column.

(Post Treatment Step)

The squeezed vegetable fluid thus obtained is subjected to adjustment of concentration, sugar content, and pH, addition of food additives and the like, mixing with other food materials, sterilization, and the like, if needed.

The squeezed vegetable fluid can be utilized for, besides beverages, various applications such as other drink and food, cooked foods, seasonings, and the like. Specifically, in the case of canned beverages, the squeezed fluid is processed into drinking products through the steps of filtration, cooling, addition of vitamin C, pre-heating, concentration, sterilization, cooling, filtration, packing into cans, and the like.

The squeezed fluid can also be subjected to drinking without any additional treatment, or otherwise, the production of beverages by optionally adding seasonings such as sugar or salt, flavor(s), preserve(s), other vegetable juice(s), and the like.

The squeezed fluid can also be used as major ingredients of jelly, yogurt, jam, bread, and the like, or their additive foods.

What is claimed is:

1. A method for treating brassicaceous vegetable comprising a chopping step, a heat treating step, and a squeezing step, wherein the chopping and squeezing steps are carried out after the heat treating step, in which the heating treatment is carried out by steaming the vegetables in such a manner that the temperature of the brassicaceous vegetables is maintained in the range of about 80° C. to 95° C. for 5 to 20 minutes, and, wherein a squeezed fluid obtained in the squeezing step is subjected to an ion-exchanging treatment, wherein the ion-exchanging treatment is carried out by contacting the fluid with an anionic exchanger provided with a structure comprising a mixture of at least one or more inorganic anions and at least one or more organic acids to form ionic bonding.

2. The method according to claim 1 wherein a pretreatment step of loosening the whole vegetables is carried out before the heat treating step.

3. The method of claim 1, wherein the ion exchanger forms anionic bonding of inorganic anions to 5–95% of the whole ion-exchanging groups with respect to the ratio of the ionic bonding of inorganic anions and organic acids.

4. The method of claim 1, further comprising, pretreating an anionic exchanger by binding inorganic anions and organic acids to an anionic exchanger resin simultaneously.

5. The method of claim 1, wherein the inorganic anions comprise at least one of a chloride, sulfate and phosphate ions.

6. The method of claim 5, wherein the inorganic anions do not include nitrate or nitrite ions.

7. A method for producing brassicaceous vegetable beverages comprising a chopping step, a heat treating step, and a squeezing step, wherein the chopping and squeezing steps are carried out after the heat treating step, in which the heating treatment is carried out by steaming the vegetables in such a manner that the temperature of the brassicaceous vegetables is maintained in the range of about 80° C. to 95° C. for 5 to 20 minutes, and, wherein a squeezed fluid obtained in the squeezing step is subjected to an ion-exchanging treatment, wherein the ion-exchanging treatment is carried out by contacting the fluid with an anionic exchanger provided with a structure comprising a mixture of at least one or more inorganic anions and at least one or more organic acids to form ionic bonding.

8. The method according to claim 7 wherein a pretreatment step of loosening the whole vegetables is carried out before the heat treating step.

9. The method of claim 7, wherein the ion exchanger forms anionic bonding of inorganic anions to 5–95% of the whole ion-exchanging groups with respect to the ratio of the ionic bonding of inorganic anions and organic acids.

10. The method of claim 7, further comprising, pretreating an anionic exchanger by binding inorganic anions and organic acids to an anionic exchanger resin simultaneously.

11. The method of claim 7, wherein the inorganic anions comprise at least one of a chloride, sulfate and phosphate ions.

12. The method of claim 11, wherein the inorganic anions do not include nitrate or nitrite ions.

* * * * *